United States Patent [19]

Kelchner

[11] 4,355,659
[45] Oct. 26, 1982

[54] ROTARY PLUG VALVE

[75] Inventor: Jay R. Kelchner, Montour Falls, N.Y.

[73] Assignee: The Hilliard Corp., Elmira, N.Y.

[21] Appl. No.: 223,513

[22] Filed: Jan. 8, 1981

[51] Int. Cl.³ .............................................. F16K 11/07
[52] U.S. Cl. .......................... 137/625.19; 137/625.47; 137/597
[58] Field of Search ................. 251/101, 102, 104; 137/625.47, 625.19, 625.23, 625.24, 595, 597

[56] References Cited

U.S. PATENT DOCUMENTS

| 321,694 | 7/1885 | Darling | 137/625.47 |
| 1,364,497 | 1/1921 | Weir | 137/625.47 |
| 1,593,795 | 7/1926 | Cossette | 137/625.23 |
| 2,129,231 | 9/1938 | Parker | 137/625.19 |
| 3,217,744 | 11/1965 | Racicot | 137/625.24 |
| 3,595,270 | 7/1971 | McNeal, Jr. | 137/595 |
| 4,032,107 | 4/1976 | Kelchner | 251/296 |
| 4,093,178 | 6/1978 | Hughes et al. | 251/104 |

Primary Examiner—Alan Cohan
Assistant Examiner—John A. Rivell
Attorney, Agent, or Firm—Seidel, Gonda, Goldhammer & Panitch

[57] ABSTRACT

A multiple inlet multiple outlet rotary plug valve includes a valve body having two sets of ports at different elevations. Each set of ports includes three ports one of which is an inlet. A cylindrical plug is disposed within a cylindrical bore of the valve body. The plug has a discrete passage for each set of ports. Each plug port is dimensioned so that flow from an inlet can be directed to each outlet of its set in one position of the plug.

3 Claims, 8 Drawing Figures

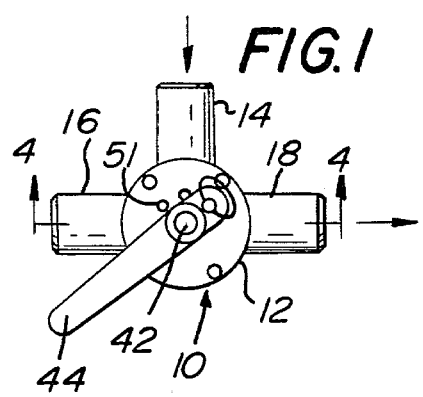
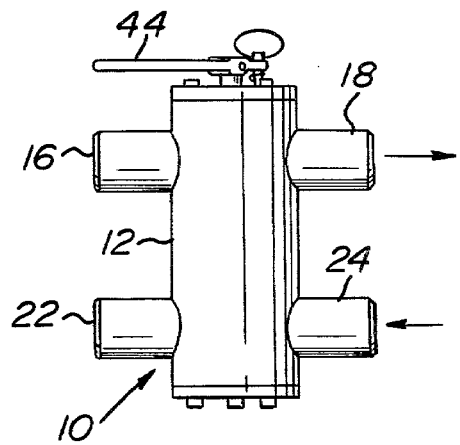
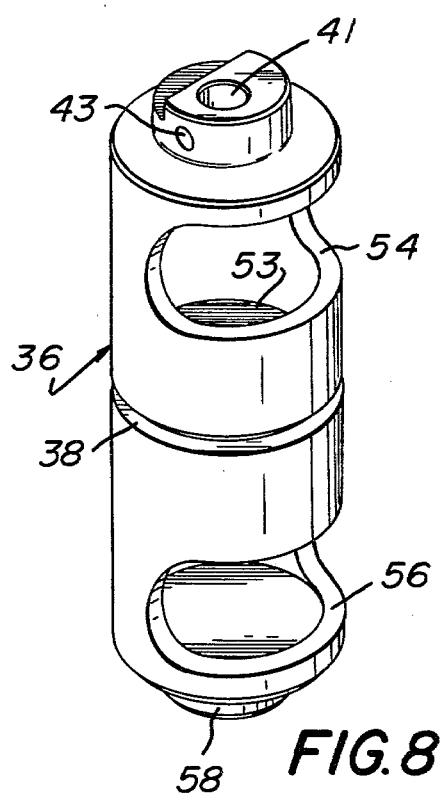
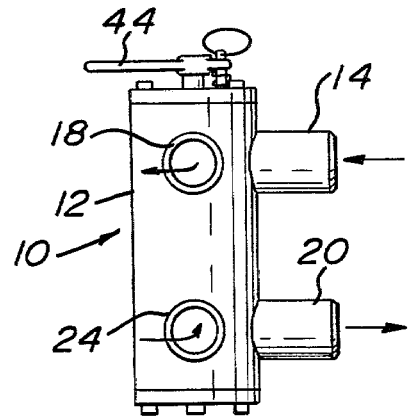

ROTARY PLUG VALVE

BACKGROUND

Plug valves of the general type involved herein are known to those skilled in the art. The present invention is an improvement over the plug valve disclosed in U.S. Pat. No. 4,032,107. In said patent, the rotary plug is tapered and mates with a tapered bore in the valve body. Tapered plugs have a number of disadvantages. Tapered plugs must be lapped to individual valve bodies to be certain that there is a control over leakage. Tapered plugs have a disadvantage in that it is difficult to provide a seal between upper and lower sets of ports. Tapered plugs must be jacked from their seat in order to turn. Jacking requires the use of tools and can result in undesired bypass of fluid from one port to another when the plug is jacked. There is very minimal interchangeability of plugs from one valve body to another valve body. Since tapered plugs must be jacked in order to be rotated, it is extremely difficult to automate rotation of such tapered plugs. If a tapered plug is not jacked prior to being rotated, the body and plug may be galled or scored.

The valve of the present invention is a solution to the above problems while providing other advantages.

SUMMARY OF THE INVENTION

The present invention is directed to a multiple inlet multiple outlet rotary plug valve. The valve includes a valve body having an upper set of three ports and a lower set of three ports. At least one of the ports of each set is an inlet with each port of the upper set being above a port of the lower set.

A valve body has a cylindrical bore of uniform diameter and the bore communicates with each of said ports. The plug has an upper passage for communicating the inlet and outlets of the upper set. The plug has a lower passage for communicating the inlet and outlets of the lower set. Each plug passage occupies a sufficient portion of the periphery of the plug whereby flow from an inlet can be directed to each outlet of its set in one position of the plug.

It is an object of the present invention to provide a novel rotary plug valve which is simpler, has fewer parts, and eliminates disadvantages associated with tapered rotary plugs.

It is another object of the present invention to provide a multiple inlet multiple outlet rotary plug valve having a cylindrical bore of uniform diameter and a rotary plug of uniform diameter for controlling flow between said ports without disadvantages associated with tapered rotary plug valves and without cross flow between sets of ports.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of a valve in accordance with the present invention.

FIG. 2 is a front elevation view of the valve.

FIG. 3 is a side elevation view of the valve.

FIG. 8 is a perspective view of the rotary plug.

DETAILED DESCRIPTION

Figure 4:
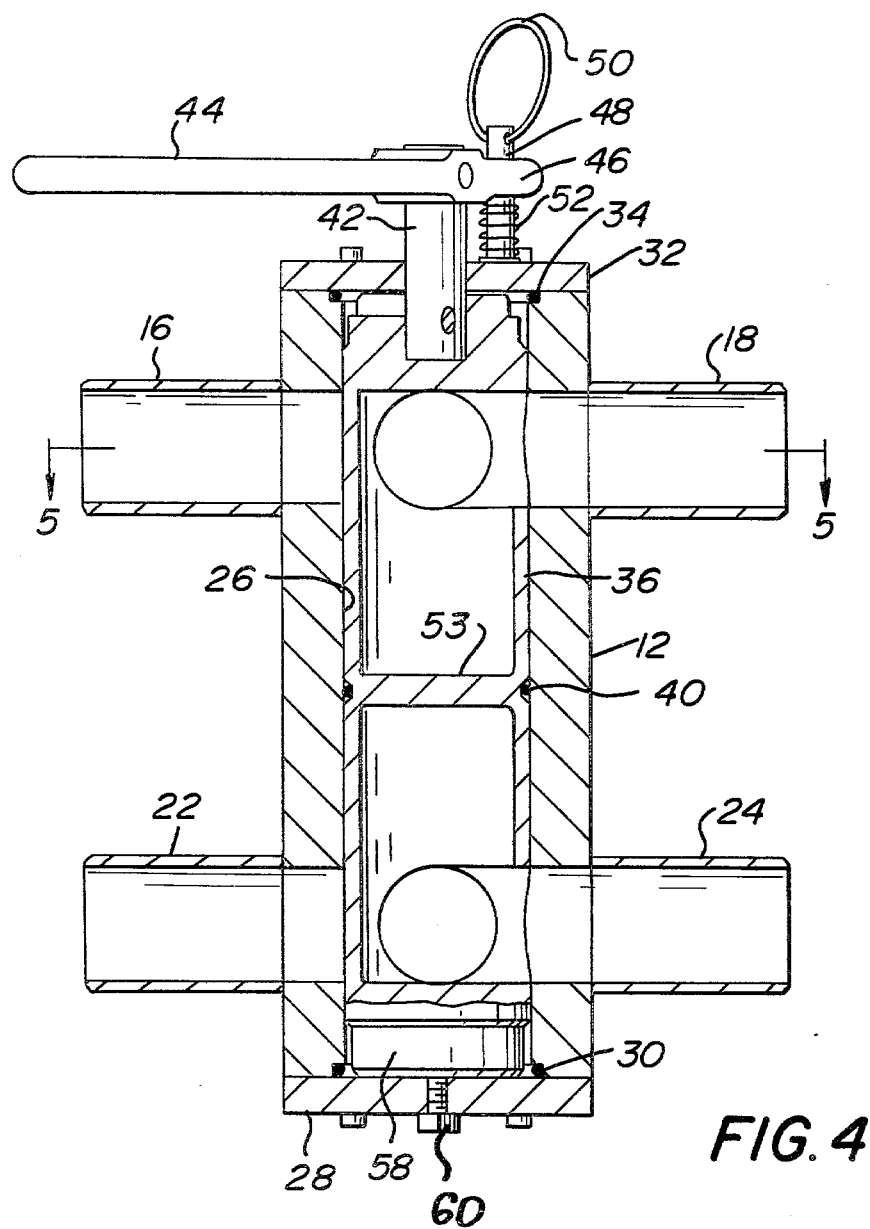
FIG. 4 is a sectional view taken along the line 4—4 in FIG. 1 but on an enlarged scale.

Referring to the drawings in detail, wherein like numerals indicate like elements, there is shown in FIGS. 1–3 a rotary plug valve in accordance with the present invention designated generally as 10. The valve 10 includes a valve body 12 having an upper set of ports including an inlet 14 and oppositely disposed outlets 16, 18. The valve body 12 also includes a lower set of ports, namely outlet 20 and oppositely disposed inlets 22, 24.

The valve body 12 is preferably in the form of a pipe so as to have a central bore of uniform diameter and open ends. This materially reduces the cost of the valve and results in other advantages as disclosed herein. Valve body 12 is preferably made of steel such as stainless steel but may be bronze or cast iron. An end cap 28 is attached to one end of the valve body 12 by use of conventional fasteners. A deformable resilient seal 30 prevents leakage from between the valve body and end cap 28. At the other end of the valve body 12, there is provided an end cap 32 and a similar seal 34.

Within the bore 26, there is provided a rotary plug 36 having a uniform outer diameter. Plug 36 is preferably cast from grey iron but may be cast from bronze or steel. Between the elevations of the first and second sets of ports, the outer periphery of the plug 36 is provided with a groove 38 containing a deformable resilient seal 40. Seal 40 contacts bore 26 and prevents any cross-flow between the upper and lower sets of ports. Prevention of cross flow is very important if the fluid at one set of ports is clean and at the other set of ports is dirty.

A stem 42 is fixedly connected to the plug 36 in any convenient manner. Thus, the plug 36 is preferably provided with a reduced diameter portion at one end as shown in FIG. 8 with intersecting axial and radial bores 41, 43, respectively. Stem 42 extends into the bore 41 and is secured to the plug 36 by tranversely disposed pin extending through the bore 43.

A handle 44 is removably secured to the stem 42 in any convenient manner to facilitate rotation of the plug 36. A latching means is provided for latching the handle 44 in any preset position. The latching means preferably includes an extension 46 on the handle 44. See FIG. 4. A pin 48 is slideably received within a hole in the extension 46. Pin 48 is spring biased downwardly by way of a spring 52 extending between extension 46 and a head on the pin 48. Pin 48 is adapted to be received in any one of a variety of detent holes 51 in the end plate 32. A ring 50 is connected to the pin 48 to facilitate manual withdrawal of the pin 48.

The plug 36 may be solid or hollow. As shown, the plug 36 is hollow. The advantages of a hollow plug are weight reduction, lower material cost, and a minimizing of the pressure drop across the valve. When the plug 36 is hollow, a center partition such as partition 53 is necessary. Partition 53 is centered so that a casting of plug 36 will be symmetrical with no top or bottom in the cast condition, thereby providing a manufacturing advantage. See FIG. 4. The partition 53 provides sufficient mass of metal whereby the circumferential groove 38 may be applied without danger of weakening the plug 36.

The plug 36 has an upper passage or port 54 for controlling flow between the inlet 14 and outlets 16, 18. Plug 36 has a lower passage or port 56 for controlling flow between the outlet 20 and its associated inlets 22, 24. The ports 54, 56 are disposed one above the other as shown more clearly in FIG. 8. The manner in which the plug ports cooperated with the associated set of inlets and outlets is identical. Hence, only port 54 will be described in detail. It will be understood that the description also applies to port 56.

Figure 5:
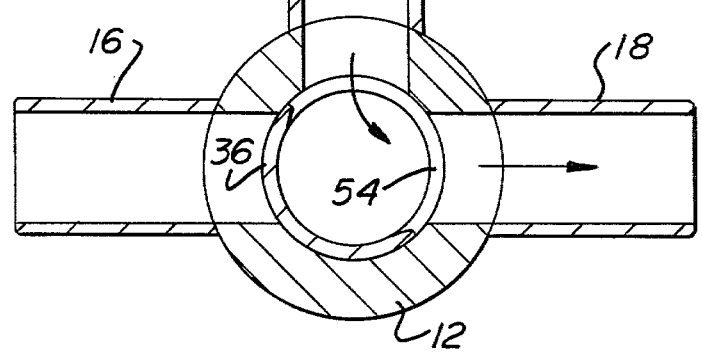
FIG. 5 is a sectional view taken along the line 5—5 in FIG. 4.

In FIG. 5, the plug 36 is shown rotated to a position wherein port 54 communicates the inlet 14 with the outlet 18. It will be noted that the port 54 is a peripheral port similar to a notch and extends for an arcuate circumferential length of approximately 180° so that the entirety of the inlet 14 is in communication with the entirety of the outlet 18 with minimal pressure drop.

Figure 6:
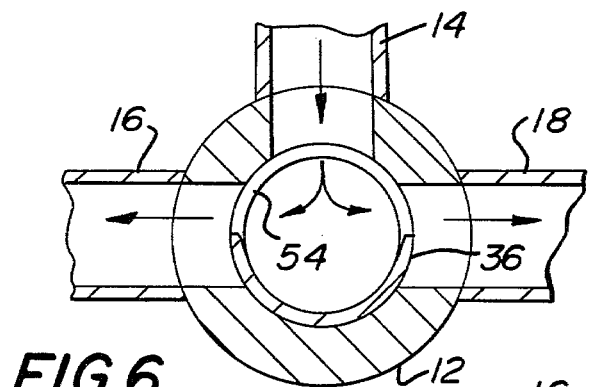
FIGS. 6 and 7 are sectional views similar to FIG. 5 but showing different positions of the rotary plug.
Figure 7:
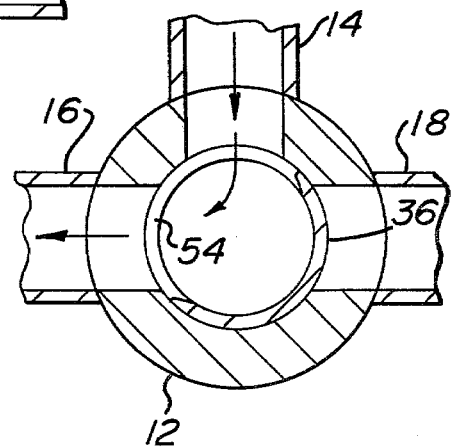

In FIG. 6, the plug 36 is shown rotated to a position wherein the inlet 14 communicates with both the outlet 16 and the outlet 18 with partial flow to each of them. Due to the arcuate extent of port 54, inlet 14 communicates with outlet 16 before the plug completely closes off flow to outlet 18. As shown in FIG. 7, the plug 36 has been rotated to a position wherein the inlet 14 communicates only with the outlet 16.

The outlets 16, 18 and the inlets 22, 24 may communicate with any desired type of system. In a preferred embodiment of the invention, the valve is designed for controlling flow of a liquid such as oil to be circulated through a duplex filtration system.

The valve as disclosed herein facilitates automating rotation of the plug 36 by a mechanical actuator, by a motor driven electrical actuator, or by a fluid actuated cylinder after removal of components 44, 48, 50, 52. Each inlet and outlet is preferably provided with a flange in any conventional manner to facilitate bolting to associated conduits. The end of the plug 36 adjacent end cap 28 may be provided with a reduced diameter portion or hub 58. An adjustment screw 60 can be threaded through a central aperture in the end cap 28 and extend into a blind hole in the hub 58 to facilitate adjusting the vertical position of the plug ports 54, 56 with respect to their associated inlet and outlets.

The detent holes 51 are orientated to receive an end of pin 48 when plug 36 is in its various rotated positions such as those shown in FIGS. 5-7 as well as a completely closed position.

The present invention may be embodied in other specified forms without departing from the spirit or essential attributes thereof and, accordingly, reference should be made to the appended claims, rather than to the foregoing specification, as indicating the scope of the invention.

I claim:

1. A multiple inlet multiple outlet rotary plug valve comprising a valve body having an upper set of three ports and a lower set of three ports, each set occupying about 180° of valve body circumference, one set of ports including a single inlet and multiple outlets, the other set of ports including multiple inlets and one outlet, each port of the upper set being above a port of the lower set, a cylindrical bore of uniform diameter in said housing and communicating with each port of each set, a cylindrical plug of uniform diameter rotatably mounted in said bore, said plug having a peripheral groove intermediate its ends, means including a deformable seal in said groove for preventing cross-flow between the ports of said sets, said plug having a discrete peripheral flow passage associated with each set of ports, each plug flow passage occupying about 180° of the plug circumference, whereby each valve body port communicates with the associated valve body ports of its set in one position of the plug, and a handle connected to one end of said plug for rotating said plug about its longitudinal axis between open and closed positions.

2. A valve in accordance with claim 1 wherein said valve plug is a hollow casting having a center partition and end walls integral in one piece, said center partition being at an elevation between the elevations of said sets of ports and forming part of said means, said plug ports communicating with the hollow interior of said plug on opposite sides of said partition.

3. A valve in accordance with claim 2 wherein said plug is provided with an integral reduced diameter portion at one end, said handle extending into a blind hole in and being connected to said reduced diameter portion.

* * * * *